United States Patent [19]

Malmin et al.

[11] Patent Number: 4,958,081
[45] Date of Patent: Sep. 18, 1990

[54] FOCUSING COLLIMATOR AND METHOD FOR MAKING IT

[75] Inventors: Ronald E. Malmin, Chicago; William R. Guth, Hoffman Estates, both of Ill.

[73] Assignee: Siemens Gammasonics, Inc., Hoffman Estates, Ill.

[21] Appl. No.: 765,611

[22] Filed: Aug. 14, 1985

[51] Int. Cl.⁵ .............................................. G21K 1/02
[52] U.S. Cl. ................................. 250/505.1; 378/147; 378/149
[58] Field of Search ................................ 378/147, 149; 250/505.1

[56] References Cited

U.S. PATENT DOCUMENTS

| | | |
|---|---|---|
| 2,638,554 | 5/1953 | Bartow et al. ........................ 378/147 |
| 2,731,718 | 1/1956 | Schaefer ............................... 378/149 |
| 3,407,300 | 10/1968 | Hansen ................................. 378/149 |
| 3,937,969 | 2/1976 | Muehllehner ....................... 250/505 |
| 4,081,687 | 3/1978 | York et al. ........................... 250/505 |
| 4,597,096 | 6/1986 | Larrson ................................ 378/149 |

FOREIGN PATENT DOCUMENTS

WO82/00897 3/1982 PCT Int'l Appl.

Primary Examiner—Jack I. Berman
Attorney, Agent, or Firm—Mark H. Jay

[57] ABSTRACT

A focusing collimator has a plurality of corrugated strips which are built up in a stack. Within each stacking plane of interest, each strip is shaped in cross-section as a part of a different radial sector of a common predetermined annulus.

2 Claims, 3 Drawing Sheets

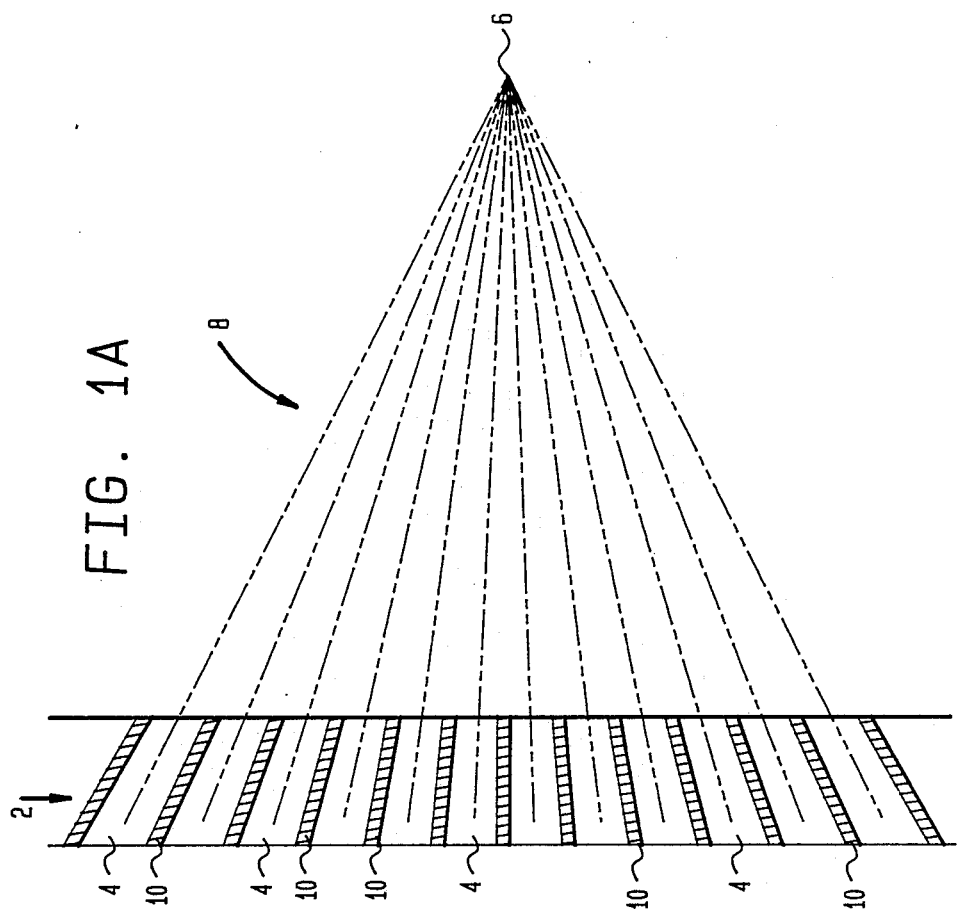
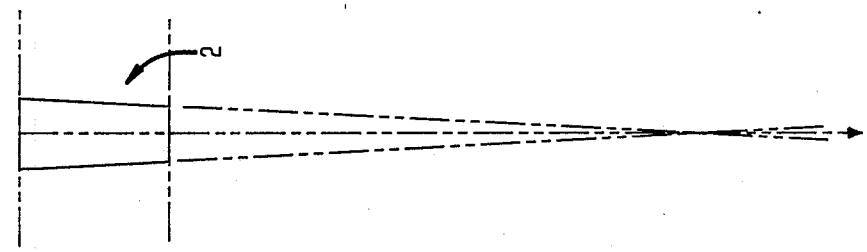

FOCUSING COLLIMATOR AND METHOD FOR MAKING IT

BACKGROUND OF THE INVENTION

The invention relates to collimators, and more particularly relates to focusing collimators which are built up by stacking up corrugated strips, one adjacent the next.

One example of this type of collimator is a conventional cone beam collimator which is built up from a plurality of identical strips. Each strip is corrugated to create a plurality of channels which all aim at a single focal point. The strips are tapered in cross-section and in the ideal case all the focal points of the individual strips would coincide at a single focal point.

In practice, conventional construction techniques used for cone beam collimators do not produce collimators which focus to a single point. This is because the strips are identical, and are stacked in a planar fashion. It is geometrically impossible to maintain a punctate focal point if identically tapered strips are stacked up on a flat plane. This causes geometric distortion in the planar image and subsequent loss of resolution in the back-projected (or tomographic) image. This degradation—stacking error—is not limited to cone beam collimators; it exists in all focusing collimators in which corrugated strips are stacked one adjacent the other.

Additionally, a conventional collimator has channels of constant size in the stacking plane. This has the consequence that sensitivity drops off rapidly from the center of the collimator to the edge.

It is therefore one object of the invention to provide a focusing collimator which has less stacking error than do known collimators.

Another object is to provide such a collimator which is comparatively easy to manufacture, particularly using automated and automatable assembly techniques.

Still a further object is to provide such a collimator which has a reasonably constant sensitivity over its entire surface.

Yet another object is, in general, to improve on known focusing collimators, and particularly known collimators which converge or diverge in one or two or orthagonal directions, e.g. cone beam collimators.

SUMMARY OF THE INVENTION

In accordance with the invention, there is provided a focusing collimator which comprises a plurality of corrugated strips which are of different shapes in cross-section. The strips are stacked up in a stacking plane, and the cross-sections of the strips are defined by the intersections of each of the strips with the stacking plane. Within each stacking plane of interest, each strip is shaped in cross-section as a part of a different radial sector of a common predetermined annulus. Because this annulus is common to all the strips which make up the collimator, a punctate or substantially punctate focal point within the stacking plane of interest is inherently built into the device.

In accordance with the invention, each strip can be individually sized (as by automatic equipment) and then stacked on a flat surface. Alternatively, a plurality of strips can all be stacked (as by manual assembly) on a mandrel having a curvature equalling the inner radius of curvature of the annulus and then machined flat, as by milling.

Each of the strips may subtend a constant solid angle. In this case, the channels in the collimator also subtend a constant solid angle. This has the consequence that the channels of the collimator increase in size from center to edge. This results in a more uniform sensitivity across the entire surface of the collimator, instead of a steady reduction in sensitivity from center to edge that results from using channels of constant diameter.

BRIEF DESCRIPTION OF THE DRAWINGS

Exemplary and non-limiting preferred embodiments of the invention are shown in the drawings, in which:

FIG. 1 shows an end view of a strip of the type used in cone beam collimators;

FIG. 1A shows a side view of the strip of FIG. 1;

DETAILED DESCRIPTION OF PREFERRED EMBODIMENTS

Figure 2:
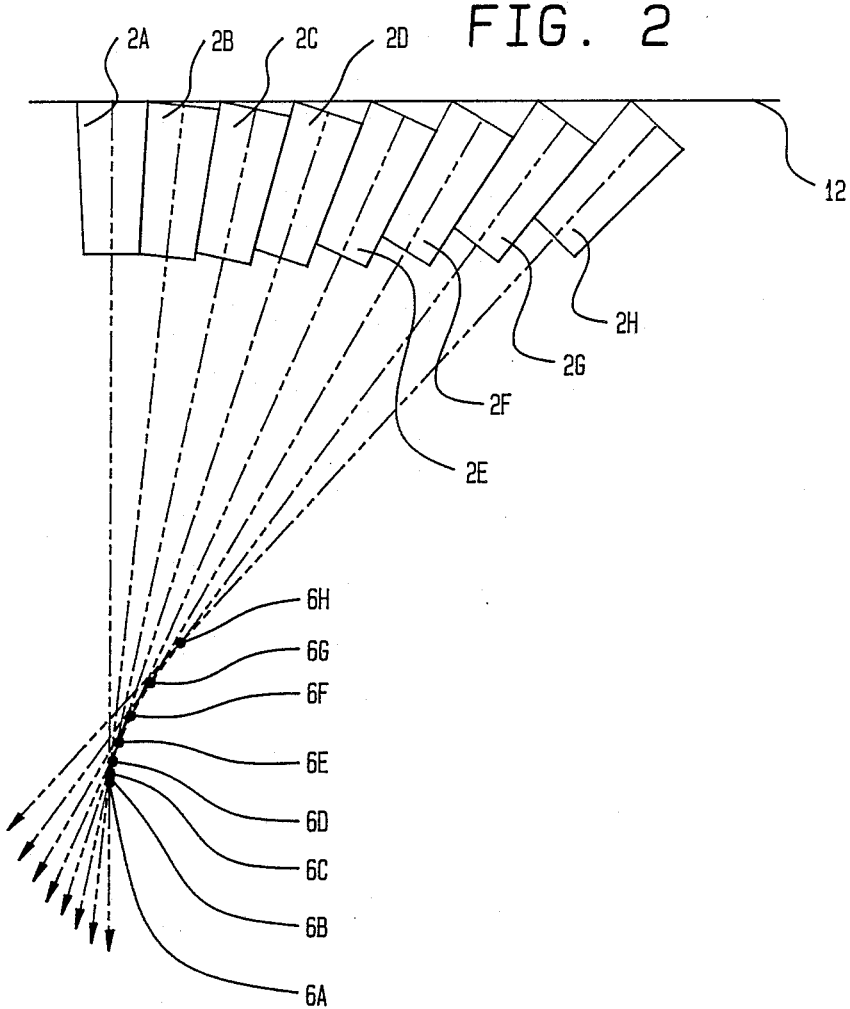
FIG. 2 shows how known cone beam collimators develop stacking error in the stacking plane of interest.

The preferred embodiment described below is a cone beam collimator. However, the invention is not limited to cone beam collimators; it is equally applicable to any collimator which is built up of a stack of corrugated strips which focus in the stacking plane, and where it is desired to minimize or eliminate stacking error.

In FIGS. 1 and 1A, a strip generally indicated by reference numeral 2 is shown on end and from the side, respectively. (FIGS. 1 and 1A are merely illustrative, and are not to scale.) The strip 2 has a plurality of channels 4. The channels 4 are all aimed at a common focal point 6 to form a two-dimensional fan beam generally indicated by reference numeral 8.

The channels 4 are separated from each other by corrugations 10. The corrugations 10 may be formed in a variety of ways, but the details of corrugations 10 are not part of the invention.

While the term "strip" as used herein may denote a unitary element made for example of a single sheet of corrugated material, the term also encompasses a two-element structure such as a corrugated member backed with a flat sheet. As used herein, the term "strip" includes all structures which either by themselves or in cooperation with neighboring ones form channels which collimate, e.g., gamma radiation. In the preferred embodiment, the finished collimator is intended for use with a gamma ray scintillation camera so that the strips 2 are made of lead, but this not a part of the invention. The material used for the strips 2 depends upon the type of radiation to be collimated.

A disadvantage of known cone beam collimators for gamma radiation is illustrated in FIG. 2. In a conventional finished collimator, a plurality of finished strips 2A-2H are stacked adjacent each other in a stacking plane. (FIG. 2 is exaggerated for clarity and is not to scale; there would always be more than 8 strips in a collimator and their misalignment would never be so pronounced.) Each of the finished strips 2A-2H in the collimator is identical to all the others, and each has an individual focal point 6A-6H. As can be seen in FIG. 2, the focal points 6A-6H do not coincide in the stacking plane; they are spaced from each other.

This is because during fabrication of a conventional collimator, the identical finished strips 2A-2H are stacked one adjacent the other on a flat surface represented by line 12 and are bonded together in a finished unit. As more strips are added, the cumulative error of focusing increases. This decreases resolution of a back-projected image.

Figure 3:
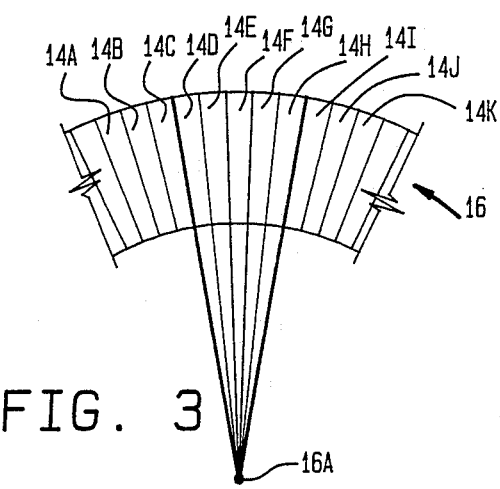
FIG. 3 illustrates identical semi-finished strips which can be used to make a collimator in accordance with the invention.

As is schematically shown in FIG. 3, individual semi-finished strips 14A-14K in accordance with a preferred embodiment of the invention are all identically shaped and are all different radial sectors of a common predetermined annulus generally indicated by reference numeral annulus 16. In their side views, each of the strips 14A-14K is corrugated in the same way as is the strip 2 in FIG. 1A. A single focal point, namely the center 16A of the annulus 16, is therefore built into the assembly. In accordance with invention, these individual semi-finished strips 14A-14K can be used to manufacture a cone beam collimator in one of two preferred ways.

Figure 4:
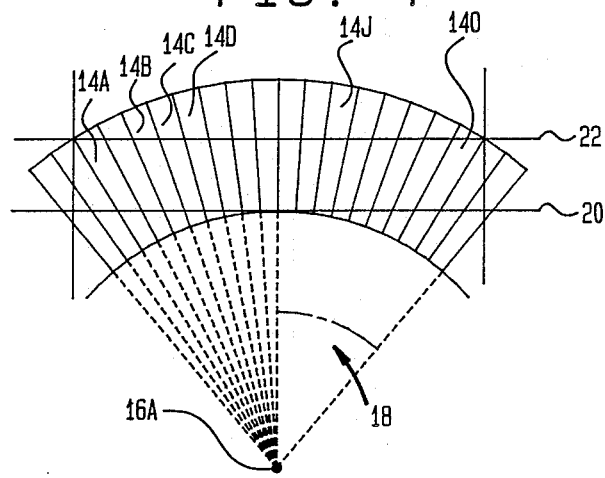
FIG. 4 illustrates a first preferred embodiment of a method in accordance with the invention.

The first preferred method is illustrated in FIG. 4. In this case, the semi-finished strips 14A etc. are all stacked, as by hand, on a mandrel 18. The mandrel 18 has a cylindrical cross-section and has the same radius of curvature (and the same center 16A) as the inner radius of curvature of the annulus 16. The semi-finished strips 14A etc. are bonded together (as by adhesive) so that they form a unitary structure. This is then milled or otherwise machined along the two parallel planes 20 and 22 to form a flat plate.

Figures 3A, 3B, 3C:
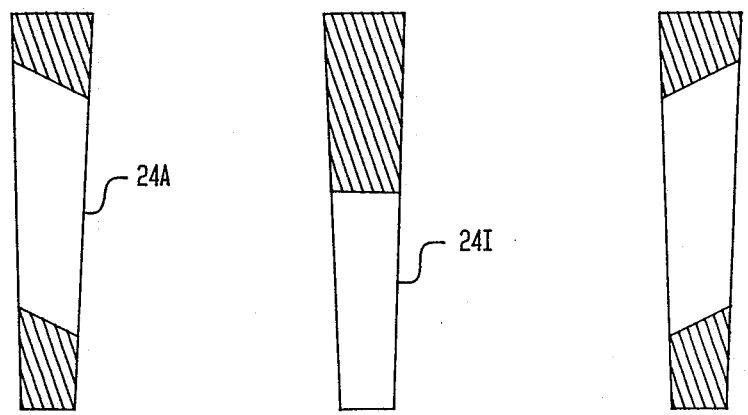
FIGS. 3A-3C illustrate three separate strips in a finished collimator in accordance with the invention, and show their relationship to a semi-finished strip such as is illustrated in FIG. 3.
Figure 5:
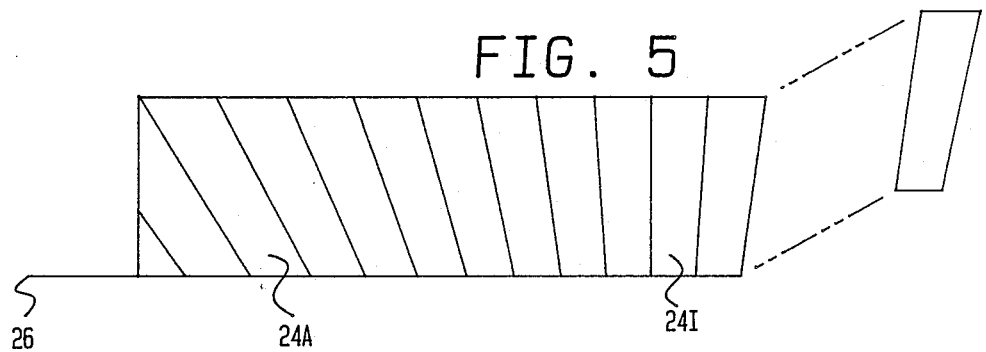
FIG. 5 illustrates a second preferred embodiment of a method in accordance with the invention.

Another alternative is illustrated in FIG. 5. Here, the semi-finished strips 14A, etc. are shaped, as by automatic machinery, in accordance with their intended positions before they are stacked and bonded together. For example, finished strip 24A is formed by cutting down one of the semi-finished strips 14 in the manner shown in FIG. 3A, strip 24I is formed by cutting down one of the semi-finished strips 14 in the manner shown in FIG. 3B, and so forth. Each individual strip to be included in the collimator is appropriately dimensioned, and stacked up on a flat plane 26. All the finished strips 24A etc. are bonded together (as by adhesive) to form the finished collimator.

A single strip from a known cone beam collimator may differ but slightly, or even imperceptibly, from a single strip from a finished collimator in accordance with the invention. Thus, FIG. 1 can equally well be said to illustrate a known collimator strip and a strip for making a collimator in accordance with the invention. Further, two strips from a collimator in accordance with the invention may appear identical. This is because the geometrical relationships in accordance with the invention do not reside in the dimensions of any one particular strip, but rather in the overall relationship between the dimensions of all of the strips in the collimator, taken as a class. In accordance with the invention, there is a relationship between the cross-sectional shape of each strip and the position of that strip in the finished collimator. While this relationship may not be observable from a comparison of neighboring strips because of manufacturing tolerances, it is nonetheless true of all the strips, taken as a class.

Because each of the illustrated finished strips is a radial sector, each is wider at its radially outward end than at its radially inward end. This means that, as shown in FIG. 1A, the channels in each finished strip are wider at one end than at the other. This relationship is preserved in the illustrated preferred embodiment, so that at the edges of the finished collimator, the channel openings are wider than they are at the center. In this preferred embodiment, each channel subtends a constant solid angle, (i.e. is conical) so that sensitivity remains constant over the entire surface of the collimator rather than dropping off from center to edge.

It is not necessary that each of the semi-finished strips 14A etc. subtend the same solid angle. As long as all of them are radial sectors of a common predetermined annulus, they can subtend different angles and yet retain the punctate focus of the preferred embodiment discussed above. Thus, for example, the strip 14A can have half the angular width of strip 14B. This can be selected when, for example, it is desired to have cylindrical channels in each strip rather than conical ones.

Those skilled in the art will understand that changes can be made in the preferred embodiments here described, and that these embodiments can be used for other purposes. Such changes and uses are within the scope of the invention, which is limited only by the claims which follow.

What is claimed is:

1. A method of manufacturing a focusing corrugated strip type collimator in which all focii lie in a single central stacking plane which is perpendicular to all of the strips, comprising
    procuring a plurality of corrugated strips which are shaped in cross-section within said central stacking plane as different parts of different radial sectors of a common predetermined annulus;
    stacking the strips on a flat surface; and
    bonding the strips together.

2. The method of claim 1, wherein all the sectors subtend a like solid angle.

* * * * *